(12) United States Patent
Maris

(10) Patent No.: US 7,875,221 B2
(45) Date of Patent: Jan. 25, 2011

(54) METHOD FOR THE CONTINUOUS PRODUCTION OF A COMPOSITION COMPRISING RUBBER, HYDROCARBON RESIN AND SOLVENT

(75) Inventor: Gianfranco Maris, Rivoli (IT)

(73) Assignee: F.LLI MARIS S.p.A., Turin (IT)

( * ) Notice: Subject to any disclaimer, the term of this patent is extended or adjusted under 35 U.S.C. 154(b) by 1414 days.

(21) Appl. No.: 10/519,493

(22) PCT Filed: Jun. 30, 2003

(86) PCT No.: PCT/EP03/06928

§ 371 (c)(1),
(2), (4) Date: Dec. 30, 2004

(87) PCT Pub. No.: WO2004/005007

PCT Pub. Date: Jan. 15, 2004

(65) Prior Publication Data

US 2005/0228076 A1    Oct. 13, 2005

(30) Foreign Application Priority Data

Jul. 3, 2002 (IT) ............................ TO02A0578

(51) Int. Cl.
*D01F 1/02* (2006.01)
*B29C 47/88* (2006.01)
*B29D 7/00* (2006.01)
*A23G 1/22* (2006.01)
*B05D 5/10* (2006.01)

(52) U.S. Cl. .................. 264/211; 264/211.13; 264/216; 425/110; 427/208.4

(58) Field of Classification Search .............. 264/176.1, 264/209.7
See application file for complete search history.

(56) References Cited

U.S. PATENT DOCUMENTS

| | | | |
|---|---|---|---|
| 3,517,096 A | 6/1970 | Wood et al. | |
| 3,978,013 A | 8/1976 | Lakshmanan | |
| 3,987,002 A * | 10/1976 | Lakshmanan | ............... 523/201 |
| 4,028,302 A * | 6/1977 | Tynan | ........................ 523/318 |
| 4,178,337 A * | 12/1979 | Hall et al. | ..................... 264/28 |
| 4,431,598 A | 2/1984 | Korpman | |
| 4,906,421 A * | 3/1990 | Plamthottam et al. | ....... 264/471 |

(Continued)

FOREIGN PATENT DOCUMENTS

DE    32 12 643 A    10/1983

(Continued)

OTHER PUBLICATIONS

Burbank et al. Producing adhesives and sealants with a twin-screw. Adhesives & Sealants Industry. Jun./Jul. 1998. vol. 5 Issue 5, p. 44.*

*Primary Examiner*—Christina Johnson
*Assistant Examiner*—Benjamin Schiffman
(74) *Attorney, Agent, or Firm*—Sughrue Mion, PLLC

(57) ABSTRACT

The method for the continuous production of a composition comprising rubber (20), hydrocarbon resin (22), and solvent (26) provides for the use of a dual-screw extruder (10), for example, a co-rotating dual-screw extruder. Preferably, at least a fraction of the solvent (26) is added at a point of the extruder (10) that is downstream of the initial section, for example, at a distance of at least 4 D from the initial section of the extruder (10).

7 Claims, 1 Drawing Sheet

U.S. PATENT DOCUMENTS 5,262,111 A * 11/1993 Capelle et al. ......... 264/211.23
5,562,936 A * 10/1996 Song et al. .................... 426/3

FOREIGN PATENT DOCUMENTS

| | | | |
|---|---|---|---|
| EP | 0 531 607 A | 3/1993 |
| EP | 0 774 481 A | 5/1997 |
| JP | 61 143439 A | 7/1986 |
| JP | 01 215880 A | 8/1989 |
| JP | 01 234424 A | 12/1989 |

* cited by examiner

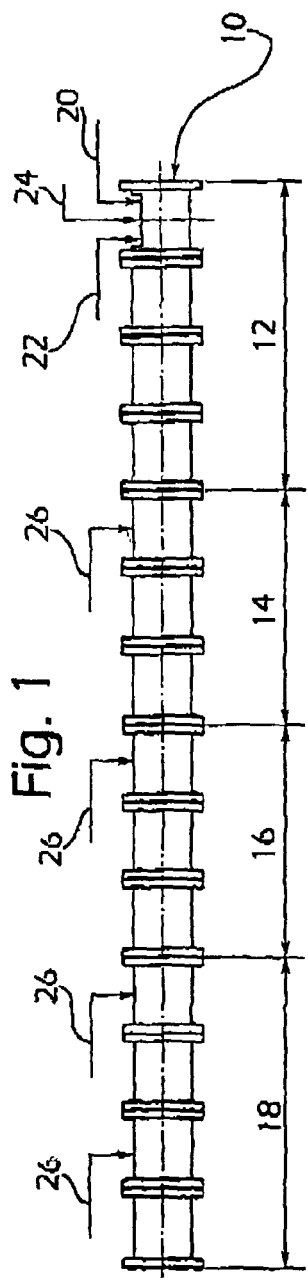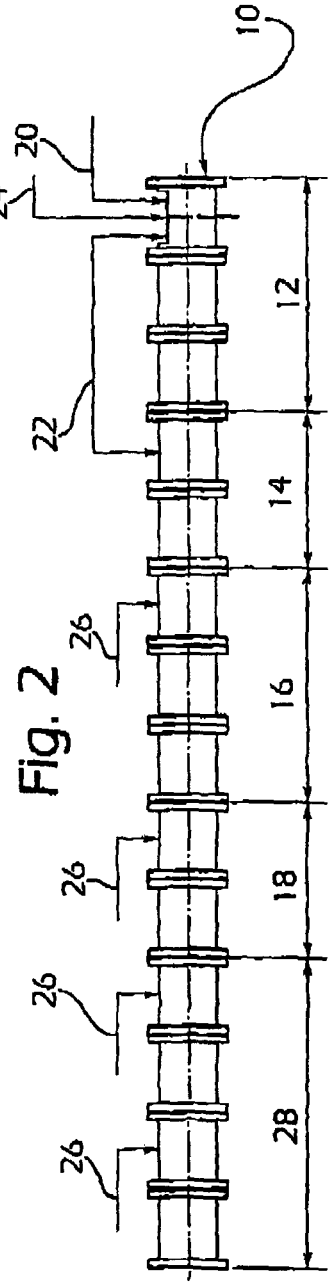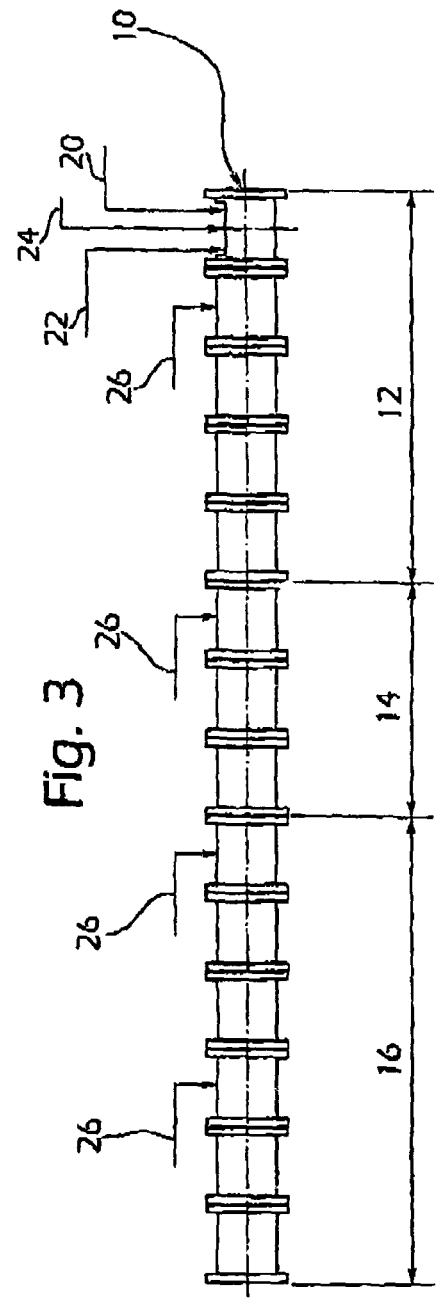

METHOD FOR THE CONTINUOUS PRODUCTION OF A COMPOSITION COMPRISING RUBBER, HYDROCARBON RESIN AND SOLVENT

The present invention relates to a method for the production of a composition comprising rubber, hydrocarbon resin and solvent, in particular, an adhesive formulation.

According to the prior art, these compositions are produced in dissolving apparatus in which the various ingredients are added by a "batch" method and are left in contact until the solvent has dissolved the rubber and the hydrocarbon resin as well as any additives that are present. However, this method does not ensure uniformity of the properties of the various production batches of a given composition.

To prevent this problem, the subject of the present invention is a method for the continuous production of a composition of the type indicated above, with the use of a dual-screw extruder.

The use of a continuous production system ensures the reproducibility of the properties of the final composition over time. In fact, the control systems with which an extruder is typically provided ensure that the process parameters—such as, for example, the time spent in the extruder, the amount of energy supplied per unit of product, the number of revolutions of the screws per unit of time, the thermal profile, and the like—which influence these properties, are maintained over time.

Moreover, the use of a dual-screw extruder, preferably of the co-rotating type, enables effective mixing of the various components of the composition to be achieved, also allowing the solvent content of the composition to be reduced, typically from values of about 65% to values of about 45-50%. This reduction is particularly significant in view of the fact that the recovery of the solvent from the final composition involves considerable costs and that a certain quantity of solvent—proportional to that which is present initially—is in any case dispersed to the exterior, resulting in environmental and economic damage.

The method of the invention preferably provides for the addition of at least one fraction of the solvent at a point of the extruder that is downstream of its initial section. Even more preferably, the solvent is added at a plurality of different points disposed downstream of the initial section of the extruder. For example, the first addition of solvent may take place at a distance of at least 4 D (where D denotes the diameter of one of the two extruder screws), for example, 20 D, from the initial section of the extruder.

Advantageously, in the portion of the extruder that is upstream of the point at which the first addition of solvent is performed, the temperature is kept within a range of between 60° C. and 120° C. whereas, in the portion of the extruder that is downstream of the point at which the first addition of solvent is performed, the temperature is kept within a range of between 40° C. and 80° C., the temperature in the upstream portion being greater than that prevailing in the downstream portion.

The rubber used may be selected from the group consisting of natural rubbers, synthetic rubbers, and mixtures thereof, for example, styrene-isoprene-styrene (SIS), styrene-butadiene-styrene (SBS), and natural rubber (NR).

As is known, a hydrocarbon resin is a resin prepared by the polymerization of unsaturated constituents of coal tar, rosin, or petroleum. Hydrocarbons having tackifying properties, for example, of the type marketed under the name Escorez or Wing-tack, and mixtures thereof are preferably used.

The solvent is selected, for example, from the group consisting of hexane, pentane, dichloropropane, and mixtures thereof.

Further advantages and characteristics of the present invention will become clear from the following detailed description which is given with reference to the appended drawings, in which:

FIG. 1 shows schematically a dual-screw extruder in which a method according to the invention is implemented, and FIGS. 2 and 3 show schematically respective dual-screw extruders in which further embodiments of the method of the invention are implemented.

A method for the continuous production of a composition comprising rubber, hydrocarbon resin, and solvent provides for the use (FIG. 1) of a dual-screw extruder 10, for example, of the co-rotating type.

A first section 12, a second section 14, a third section 16, and a fourth section 18, arranged in succession, are distinguished in the extruder 10. The first section 12 has a length equal to 16 D (where D denotes the diameter of one of the two screws of the extruder 10), the second section 14 has a length equal to about 12 D, the third section 16 has a length equal to about 12 D, and the fourth section 18 has a length equal to about 16 D.

Rubber 20, hydrocarbon resin 22, as well as conventional additives 24, for example, oxidising agents, are introduced at the beginning of the first section 12. The temperature of the first section 12 is kept between 60 and 120° C. Homogenization of the ingredients introduced takes place in the first section 12.

A fraction of between 5 and 20% of the total solvent 26 is introduced at the beginning of the second section 14. The temperature of the second section 14 is kept between 30 and 80° C. Dissolving of the rest of the ingredients in the solvent 26 takes place in the second section 14.

A further fraction of between 5 and 20% of the total solvent 26 is introduced at the beginning of the third section 16. The temperature of the third section 16 is kept between 20 and 60° C. Further dissolving of the rest of the ingredients in the solvent 26 takes place in the third section 16.

Further fractions of the solvent 26 are introduced at the beginning of and along the fourth section 18, so as to reach the desired total quantity of solvent. The temperature of the fourth section 18 is kept between 20 and 40° C. Complete dissolving of the rest of the ingredients in the solvent 26 is achieved in the fourth section 18. The temperature of the composition produced at the outlet of the extruder 10 must necessarily be less than the boiling point of the solvent 26 used.

A variant of the production method of the invention is described with reference to FIG. 2. In this variant, a first section 12, a second section 14, a third section 16, a fourth section 18, and a fifth section 28, arranged in succession, are distinguished in the extruder 10. The first section 12 has a length of about 12 D, the second section 14 has a length of about 8 D, the third section 16 has a length of about 12 D, the fourth section 18 has a length of about 8 D, and the fifth section 28 has a length of about 16 D.

Rubber 20, a fraction of between 30 and 50% of the total hydrocarbon resin 22, as well as additives 24, are introduced at the beginning of the first section 12. The temperature of the first section 12 is kept between 60 and 120° C. Homogenization of the ingredients introduced takes place in the first section 12.

The remaining fraction of the hydrocarbon resin 22 is introduced at the beginning of the second section 14. The temperature of the second section 14 is kept between 60 and 80° C. Further homogenization of the ingredients introduced takes place in the second section 14.

A fraction of between 5 and 20% of the total solvent 26 is introduced at the beginning of the third section 16. The temperature of the third section 16 is kept between 30 and 80° C. Dissolving of the rest of the ingredients in the solvent takes place in the third section 16.

A further fraction of between 5 and 20% of the total solvent 26 is introduced at the beginning of the fourth section 18. The temperature of the fourth section 18 is kept between 20 and 60° C. Further dissolving of the rest of the ingredients in the solvent takes place in the fourth section 18.

Further fractions of solvent 26 are introduced at the beginning of and along the fifth section 28 so as to reach the desired total quantity of solvent. The temperature of the fifth section 28 is kept between 20 and 40° C. Complete dissolving of the rest of the ingredients in the solvent 26 is achieved in the fifth section 28. The temperature of the composition produced at the outlet of the extruder 10 must necessarily be less than the boiling point of the solvent 26 used.

A further variant of the production method of the invention is described with reference to FIG. 3. In this variant, a first section 12, a second section 14, and a third section 16, arranged in succession, are distinguished in the extruder 10. The first section 12 has a length of about 20 D, the second section 14 has a length of about 12 D and the third section 16 has a length of about 24 D.

Rubber 20, hydrocarbon resin 22, and additives 24 are introduced at the beginning of the first section 12 and a fraction of between 2 and 10% of the total solvent 26 is introduced at a distance of 4 D from the beginning of the extruder 10. The temperature of the first section 12 is kept between 40 and 80° C. Homogenization of the ingredients introduced takes place in the first section 12.

A fraction of between 5 and 20% of the total solvent 26 is introduced at the beginning of the second section 14. The temperature of the second section 14 is kept between 30 and 60° C. Dissolving of the rest of the ingredients in the solvent 26 takes place in the second section 14.

Further fractions of solvent 26 are introduced at the beginning of and along the third section 16 so as to reach the desired total quantity of solvent. The temperature of the third section 16 is kept between 20 and 40° C. Complete dissolving of the rest of the ingredients in the solvent 26 is achieved in the third section 16. The temperature of the composition produced at the outlet of the extruder 10 must necessarily be less than the boiling point of the solvent 26 used.

Naturally, the principle of the invention remaining the same, the details of construction and forms of embodiment may vary widely with respect to those described purely by way of example, without thereby departing from its scope.

The invention claimed is:

1. A method for the continuous extrusion of an adhesive formulation comprising rubber (20), a hydrocarbon resin (22), and a solvent (26), which method comprises the following steps:

providing a dual screw extruder;

introducing the rubber and the resin into the dual screw extruder at an initial section thereof;

adding at least a fraction of the solvent (26) at a point of the extruder (10) that is downstream of the initial section;

controlling the temperature of the extruder such that the rubber and the resin are dissolved in the solvent to produce a composition and such that at the outlet of the extruder (10) the temperature of the composition is less than the boiling point of the solvent (26) whereby the composition is the adhesive formulation in which the resin and rubber are dissolved in the solvent such that the adhesive formulation has tackifying properties; and extruding the composition, wherein the portion of the extruder (10) that is upstream of the point at which the first addition of solvent (26) is performed, the temperature is kept within a range of between 60° C. and 120° C. whereas, in the portion of the extruder (10) that is downstream of the point at which the first addition of solvent (26) is performed, the temperature is kept within a range of between 40° C. and 80° C., the temperature in the upstream portion being greater than that prevailing in the downstream portion.

2. A method according to claim 1, in which a first addition of solvent (26) takes place at a distance of at least 4 times a diameter of the extruder from the initial section of the extruder (10).

3. A method according to claim 1 in which the solvent (26) is added at a plurality of different points disposed downstream of the initial section of the extruder (10).

4. A method according to claim 1, which provides for the addition of at least a fraction of the hydrocarbon resin (22) at a point of the extruder (10) that is downstream of the initial section.

5. A method according to claim 1 in which the rubber (20) is selected from the group consisting of natural rubbers, synthetic rubbers and mixtures thereof.

6. A method according to claim 1 in which the solvent (26) is selected from the group consisting of hexane, pentane, dichloropropane, and mixtures thereof.

7. A method according to claim 1 in which the dual-screw extruder (10) is of the co-rotating type.

* * * * *